United States Patent [19]

Willett

[11] 4,263,977
[45] Apr. 28, 1981

[54] CARRIER VEHICLE FOR A MOTOR-DRIVEN ROTARY MOWER

[76] Inventor: Paul E. Willett, 43 Porter St., Redcliffe, Queensland 4020, Australia

[21] Appl. No.: 107,824

[22] Filed: Dec. 28, 1979

[30] Foreign Application Priority Data

Jan. 10, 1979 [AU] Australia .............................. PD7302

[51] Int. Cl.³ ........................ B60K 5/10; A01D 55/18
[52] U.S. Cl. ........................................ 180/11; 56/15.2; 56/DIG. 22; 180/198; 180/211; 280/32.7; 280/87.01; 280/282
[58] Field of Search ...................... 180/11, 12, 13, 211, 180/198; 280/32.5, 32.7, 87.01, 282; 56/14.9, 15.2, DIG. 22

[56] References Cited

U.S. PATENT DOCUMENTS

| | | | |
|---|---|---|---|
| 2,899,793 | 8/1959 | Swisher | 180/211 |
| 2,919,756 | 1/1960 | Knipe | 180/11 |
| 2,935,333 | 5/1960 | Ekas | 56/14.9 |
| 3,721,076 | 3/1973 | Behrens | 56/14.9 |

Primary Examiner—John P. Silverstrim
Assistant Examiner—Donn McGiehan
Attorney, Agent, or Firm—D. Paul Weaver

[57] ABSTRACT

A vehicle, its frame, with a driver's seat, mounted on two rear wheels and a single steerable front wheel, is made to enable a wheel-mounted motor-driven rotary mower to be removably installed with its rear wheels between those of the vehicle, its front wheels behind the vehicle's front wheel. A drive to the vehicle's front wheel is releasably connectible to the drive shaft of the mower's motor, and means are provided for automatically lifting the mower's front wheels above the ground when the vehicle's front wheel is turned to steer to one side or the other, so as to prevent the mower wheels from being dragged sideways across the ground.

6 Claims, 2 Drawing Figures

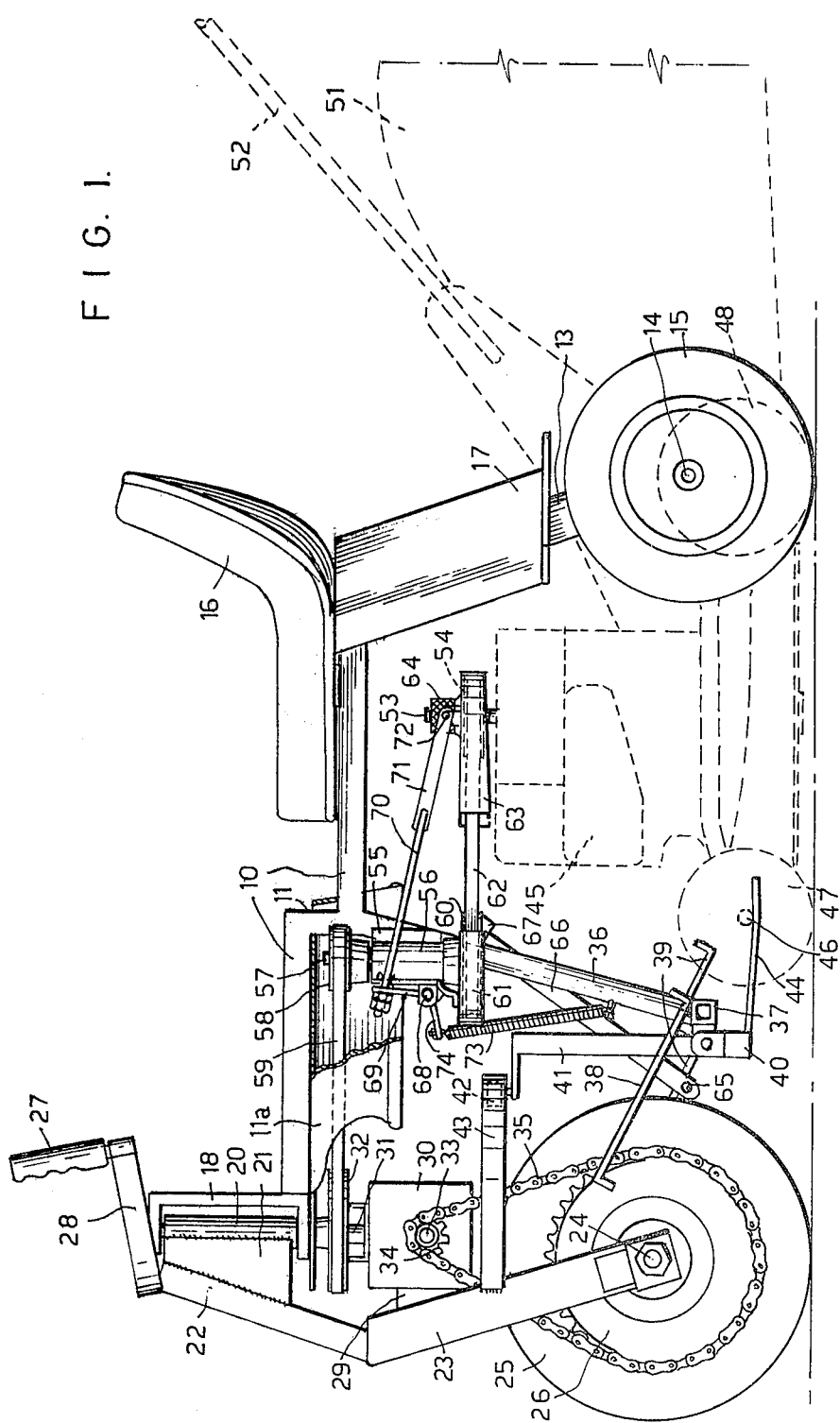

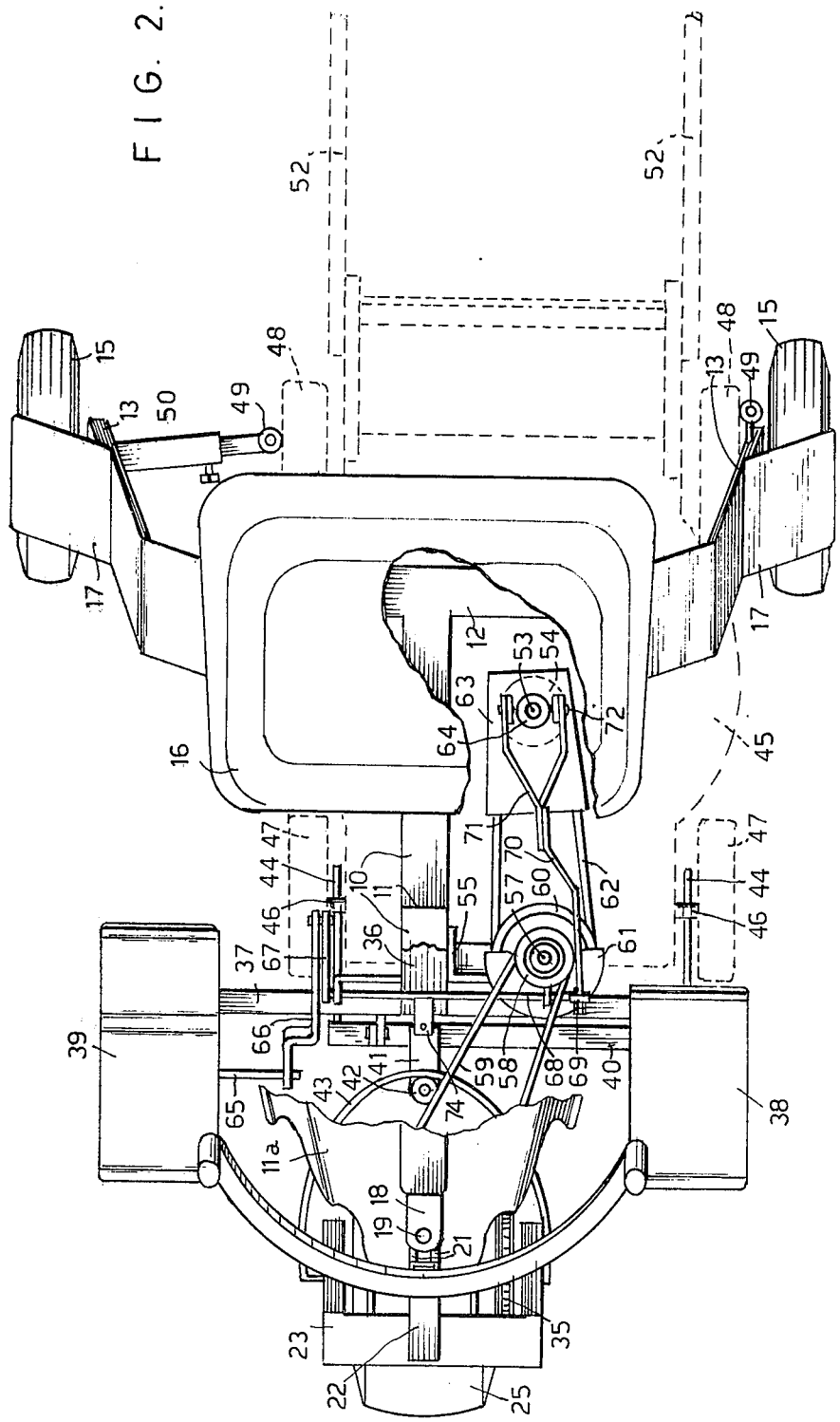

CARRIER VEHICLE FOR A MOTOR-DRIVEN ROTARY MOWER

BACKGROUND OF THE INVENTION

This invention relates to a vehicle, and more particularly to a small vehicle which, with the addition of a power-driven rotary lawn mower, serves as a rider-mower powered by the added rotary mower.

Rider-mowers greatly reduce the labour involved in mowing large areas, but they are generally expensive, and they have the disadvantage that they are not suited to mowing many areas, for example close to a fence, or under shrubs.

The general object of the present invention is to provide a vehicle which is such that a conventional or slightly modified rotary power-driven mower may be quickly and easily fitted to it and used to drive the vehicle which is thus converted to an efficient rider mower. The motor mower may be so mounted that it can be quickly disengaged when required for use in mowing areas not accessible to a rider mower.

BRIEF SUMMARY OF THE INVENTION

The present invention provides a device in the form of a small tricycle type vehicle with a driver's seat, the front wheel being steerable, the frame of the vehicle being made so that a wheel-mounted motor-driven mower may be advanced under it with the mower rear wheels between the rear wheels of the vehicle, the mower front wheels behind the front wheel of the vehicle, means being provided for engaging the mower releasably in such position. Means are also provided for releasably connecting the drive shaft of the mower's motor to the front wheel of the vehicle to drive it, and lifting means are provided so that when the vehicle front wheel is turned in either direction to steer the vehicle to one side of the other, the mower front wheels are lifted clear of the ground to prevent them from being dragged sideways as the vehicle is turned. Other features of the invention will become apparent from the following description.

BRIEF DESCRIPTION OF THE DRAWINGS

In the drawings:

FIG. 1 is a partly broken-away side elevational view of a vehicle according to the invention, with a motor mower, indicated in broken outline, fitted thereto, and FIG. 2 is a partly broken-away plan view of the assembly shown in FIG. 1.

DESCRIPTION OF THE PREFERRED EMBODIMENT

The vehicle illustrated has a frame including a top bar 10 stepped at 11, fitted with a guard plate 11a and fixed at the rear to a cross-member 12 from the ends of which a pair of wheel carrier arms 13 incline rearwardly and downwardly. At the lower ends of these arms 13 there are secured outwardly extending stub axles 14 for a pair of pneumatically tired rear wheels 15. A driver's seat 16 is mounted on the rear of the top bar 10 and cross-member 12, and mudguards 17 are fixed to the cross-member 12 and wheel carrier arms 13.

A bracket 18 at the front of the top bar 10 carries a vertical shaft 19 on which is rotatably mounted a sleeve 20 with forwardly extending plates 21 welded to a square-section tube 22 inclining forwardly and down. This tube is fixed at its lower end to the top of a front wheel fork 23 which inclines rearwards and downwards and carries an axle 24 on which a pneumatically tired front wheel 25 is rotatable together with an adjacent sprocket 26. The front wheel may be steered by means of a pair of hand grips 27 at the ends of an arcuate steering bar 28 secured at its middle to the top of the tube 22.

Brackets 29 extending rearwardly from the front wheel fork 23 support a reduction gear box 30 of which the vertical input shaft 31 is fitted with a pulley wheel 32, the horizontal output shaft 33 being provided with a sprocket 34 connected by a chain 35 to the relatively large sprocket 26 on the front wheel 25.

A central strut 36 secured to and inclining forwards and downwards from the middle part of the top bar 10 has fixed to its bottom a transverse pedal carrier bar 37. A fixed pedal or foot-rest 38 is fixed to the left hand side of this bar, and to its right hand side there is pivoted a movable control pedal 39. A transverse lifting arm carrier bar 40 in front of and below the pedal carrier bar 37 is pivoted about a transverse axis to this carrier bar, and fixed to it is an upright standard 41 with a small wheel or cam follower 42 mounted rotatably on its upper end so as to engage with a curved or U-shaped cam bar 43 the ends of which are fixed to the front wheel fork 23.

A pair of lifting arms 44 extend rearwardly from the ends of the lifting arm carrier bar 40.

A hand-propelled motor driven rotary mower of well known type, as indicated in broken outline at 45, may be moved forward between the rear wheels 15, and so that the axles 46 of the mower's front wheels 47 are located over the two lifting arms 44, the mower's rear wheels 48 then being located between the rear wheels 15 of the vehicle and held spaced therefrom by a pair of stop rollers 49, bearing against the tires of the wheels, one of the rollers being mounted on the left-hand wheel carrier arm 13, the other being carried by a telescopically adjustable mounting arm 50 extending from the right-hand wheel carrier arm. As shown in FIG. 2, the mower 45 is then not located centrally with respect to the vehicle, but is off-set to the left about as far as practical, the most effective grass cutting of the mower's rotating blades being done at the left-hand side. The mower's grass-catcher, part of which is indicated at 51 in FIG. 1, may be attached to the mower, and its handles, part of which are indicated at 52, may be left extended to the rear.

The mower is modified in that its vertical engine shaft 53 is extended upwardly and fitted with a pulley-wheel 54, the shaft above the pulley wheel being formed with a left-hand thread.

A mounting bracket 55 secured on the strut 36 supports a vertical bearing housing 56 containing bearings for a counter-shaft 57 having at its upper end a pulley wheel 58 connected by a belt 59 to the pulley wheel on the input shaft 31 of the gear box 30, and having at its lower end a pulley wheel 60 the front part of which is within an arcuate fixed belt guide 61 mounted below the bearing housing 56. A belt 62 engaged on the pulley wheel 60 and extending as a loop rearwardly therefrom is, at its rear part, within a movable belt guide 63, open at front, bottom and rear, and formed with a bearing for the upper end of the mower motor shaft 53. When the mower 45 is well forward relative to the vehicle, the movable belt guide 63 may be installed as shown, the mower motor shaft 53 passing through the bearing in the belt guide and being engaged by a knurled left-hand-thread nut 64. The rear loop of the belt 62 will, at the same time, be guided, by the belt guide 63, to engage loosely with the pulley wheel 54.

It will be apparent that if the mower 45 is then moved rearwardly relative to the vehicle, the belt 62 will be tensioned so that the mower motor will act through the belt 62 and pulleys 54 and 60, counter-shaft 57, pulley wheels 58 and 32 and belt 59, gear box 30 and chain drive to the front wheel 25, to propel the vehicle. This is done by the operation of the movable pedal 39 which has projecting laterally from it a rod 65 connected by a connecting rod 66 to a lever 67 on one end of a transverse shaft 68 having at its other end a lever 69 connected, by a rod 70 and a fork 71 secured thereto, to the movable belt guide 63, the rear ends of the fork being pivoted at 72 to the belt guide. A helical tension spring 73 connected between a lever 74 extending from the shaft 68 and the central strut 36 acts to urge the movable pedal 39 to an upwardly and forwardly tilted position, but when the front of the pedal is depressed, the belt 62 is tensioned and the operative connection between the mower motor and the vehicle's front drive wheel is made.

In use, the mower is connected as described to the vehicle, its motor is started, and the assembly is used as a rider mower, the control pedal 39 being used to start and stop the vehicle. No brake is required for the vehicle, the drive wheel 25 of which is effectively braked, when not being driven, by its chain connection to the reduction gear box. When the vehicle is steered to left or to right, the cam bar 43 advances the cam follower 42 to tilt the standard 41, lifting arm carrier bar 40 and lifting arms 44, so that three front wheels 47 of the mower are raised clear of the ground. Otherwise, when the vehicle is being driven straight forward, the mower 45 rides on its own front and rear wheels. The lifting of the front of the mower when the vehicle is being steered to one side or the other does not materially affect the height at which the mowing is being done, as the height of the mower blades at the rear part of their travel is barely changed.

The mower may be quickly and easily disengaged from the vehicle for use in mowing areas which cannot conveniently be reached by the rider mower assembly.

I claim:

1. A vehicle including:
   a frame with a driver's seat and supported on two rear wheels and a steerable front wheel,
   engagement means, on said frame, for releasably engaging a wheel-mounted motor-driven rotary mower with its rear wheels between said vehicle rear wheels, its front wheels behind said front wheel,
   vehicle drive means adapted for releasable connection to the drive shaft of said mower motor to said vehicle front wheel, and
   lift means adapted automatically to lift said mower front wheels above the ground when said vehicle front wheel is turned to steer said vehicle to one side or the other.

2. A vehicle according to claim 1 wherein:
   said engagement means include stop rollers on said frame, adapted to contact the outer parts of said mower rear wheels, one of said stop rollers being laterally adjustable.

3. A vehicle according to claim 1 wherein:
   said engagement means include lifting members adapted to engage under the axles of said mower front wheels, and
   said lift means include a cam mechanism adapted simultaneously to raising said lifting members when said vehicle front wheel is turned to steer said vehicle to either side.

4. A vehicle according to claim 3 wherein:
   said vehicle front wheel is carried by a front fork oscillatable about a substantially vertical axis,
   said lifting members are mounted on a transverse member oscillatable about a transverse axis, and
   said cam mechanism includes a cam secured to said front fork and a cam follower engaging said cam and mounted above said transverse member.

5. A vehicle according to claim 1 wherein said vehicle drive means include:
   a first pulley wheel on said drive shaft,
   a second pulley wheel on a counter-shaft on said frame and operatively connected to said vehicle front wheel,
   a belt engaging said first and second pulley wheels, and
   means for tensioning said belt to connect said first pulley wheel operatively to said second pulley wheel, and for slackening said belt.

6. A vehicle according to claim 5 wherein said means for tensioning and slackening said belt include:
   pedal-operated means for retracting or advancing said motor mower relative to said vehicle.

* * * * *